US005963907A

United States Patent [19]
Matsumoto

[11] Patent Number: 5,963,907
[45] Date of Patent: Oct. 5, 1999

[54] VOICE CONVERTER

[75] Inventor: Shuichi Matsumoto, Hamamatsu, Japan

[73] Assignee: Yamaha Corporation, Hamamatsu, Japan

[21] Appl. No.: 08/921,284

[22] Filed: Aug. 29, 1997

[30] Foreign Application Priority Data

Sep. 2, 1996 [JP] Japan .................................... 8-232095

[51] Int. Cl.$^{6}$ ................................ G10L 9/00; G09B 5/00

[52] U.S. Cl. .............................. 704/270; 84/610; 84/619; 84/616; 434/307 A

[58] Field of Search .................................... 704/270, 272, 704/207, 209, 233; 84/609, 610, 616, 619, 654, 657, 665; 434/307 A

[56] References Cited

U.S. PATENT DOCUMENTS

| | | | |
|---|---|---|---|
| 5,278,346 | 1/1994 | Yamaguchi | 84/609 |
| 5,361,324 | 11/1994 | Takizawa et al. | 704/233 |
| 5,569,038 | 10/1996 | Tubman et al. | 434/308 |
| 5,617,478 | 4/1997 | Tagami et al. | 381/56 |
| 5,621,182 | 4/1997 | Matsumoto | 84/610 |
| 5,641,926 | 6/1997 | Gibson et al. | 84/603 |
| 5,750,912 | 5/1998 | Matsumoto | 84/609 |

*Primary Examiner*—Susan Wieland
*Attorney, Agent, or Firm*—Pillsbury Madison & Sutro LLP

[57] ABSTRACT

A voice converter provides for pitch and formant shifting of an input voice signal. An audio filter extracts the volume level of the input voice signal, and outputs the extracted volume level as first volume data. A second audio filter extracts the volume level of an output voice signal, and outputs the extracted volume level as second volume data. A difference judging circuit compares the first and second volume data with each other, and determines a volume gain and a distorting factor which is supplied to a distortion circuit. When the volume of the output voice after conversion is smaller than that of the input voice, the volume gain is increased. In a case where the input voice is to be shifted toward higher frequencies, when the volume of the output voice after conversion is smaller than that of the input voice, it is determined that the volume of a high-pitched sound region is insufficient, and the distorting factor is increased in order to enlarge the amount of higher harmonics which are to be added to the input voice.

9 Claims, 4 Drawing Sheets

VOICE CONVERTER

BACKGROUND OF THE INVENTION

1. Field of the Invention

This invention relates to a voice converter which is suitably used in, for example, a karaoke apparatus.

2. Background

In the field of a karaoke apparatus or the like, recently, many kinds of voice converting techniques in which a process such as frequency conversion is applied to an input voice to produce various effects, have been developed. For example, known are techniques in which the interval of an input voice is shifted by predetermined degrees and the resulting voice is added to the original voice, thereby attaining a so-called harmony effect, and in which a voice of a male is converted into that of a female by shifting an input voice toward higher frequencies by one octave or shifting the formant (the resonance frequency of the vocal tract).

In the voice conversion of the prior art, usually, only a pitch shift or a formant shift is conducted on an input voice so that the formant is merely shifted toward a higher or lower frequency on the frequency axis. Depending on the frequency characteristics of input voices (i.e., the voice quality), therefore, the voice conversion is appropriately conducted, or it is not appropriately conducted, for example, the volume is extremely reduced as a result of the conversion, or an unnatural voice is obtained. Namely, the conversion has a problem in that the result of the conversion is not uniform. The conversion has a further problem in that the range in which the conversion is enabled is restricted to a very narrow one by such nonuniformities.

SUMMARY OF THE INVENTION

The present invention has been developed in view of the circumstances described above. It is an object of the invention to provide a voice converter in which nonuniformities of the voice conversion due to differences in characteristics of input voices can be compensated.

The foregoing object of the invention is achieved by a voice converter which includes a first extracting device which extracts a first parameter from an input voice. A voice converting device converts the input voice into a voice having a different frequency (i.e., performs a shift of the input voice frequency). A second extracting device extracts a second parameter from the frequency shifted voice. A comparison is made between the first and second to provide a signal which controls the conversion process performed by the voice converting device.

In one embodiment, the first parameter is the volume level of the input voice and the second parameter is the volume level of the output voice. The comparison of the two volume levels results in a control signal used to adjust the volume level of the input voice. Alternatively, the comparison of the two volume levels results in a control signal used to adjust the level of higher harmonics which are added to the input voice.

The conversion of the input voice may include a pitch shift. Likewise, the input voice conversion may include a formant shift.

DETAILED DESCRIPTION OF THE PREFERRED EMBODIMENT

Hereinafter an embodiment of the invention will be described with reference to the accompanying drawings. The following description is directed to an embodiment in which the invention is applied to a karaoke apparatus. However, the application of the invention is not limited to a karaoke apparatus of this type and the invention may be applied also to karaoke apparatus or voice converters of other types.

A: Configuration of the Embodiment (1) Overall Configuration

Figure 1:
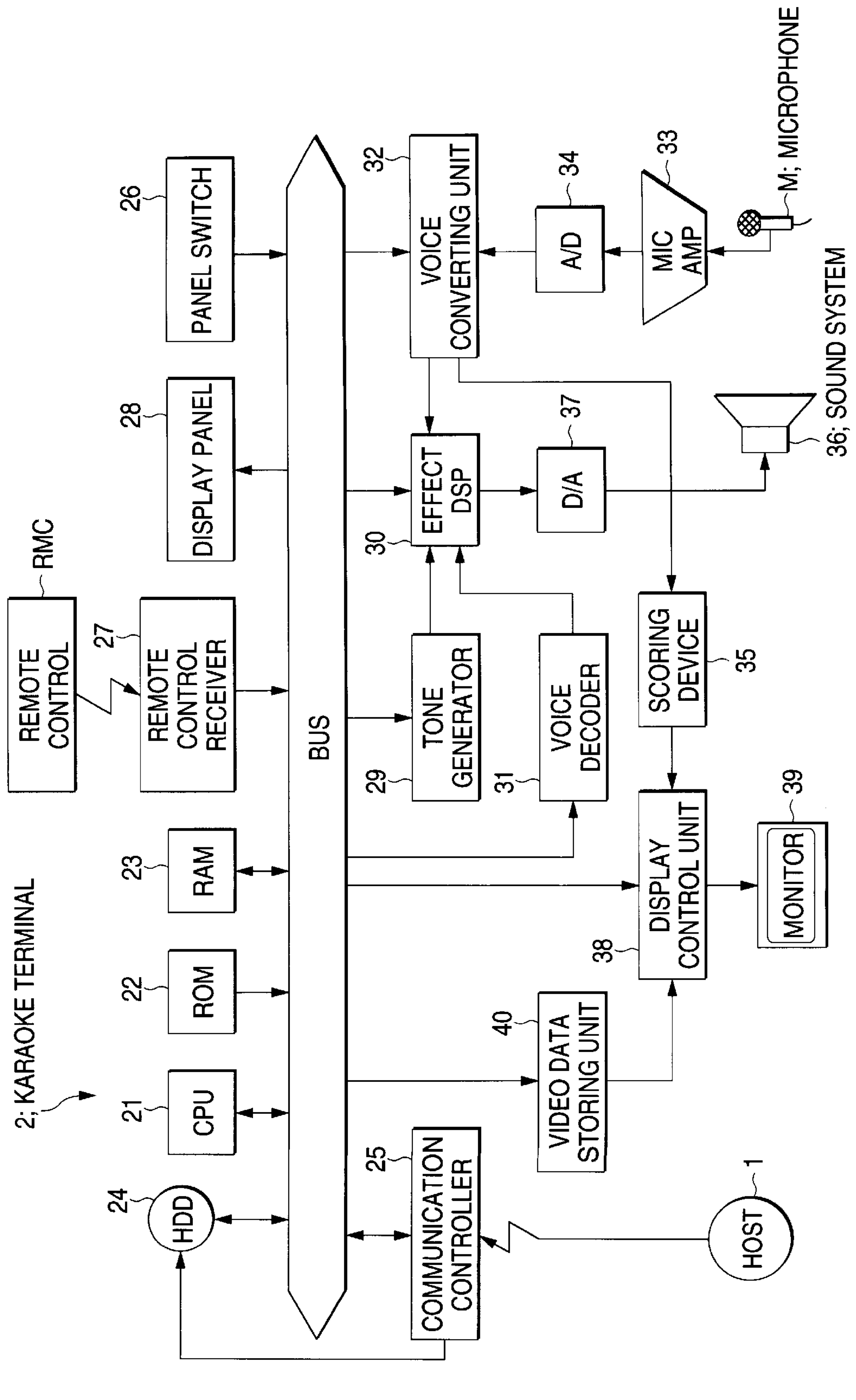
FIG. 1 is a block diagram showing the overall configuration of an embodiment of the invention.

FIG. 1 is a block diagram showing the whole configuration of an embodiment of the invention. In FIG. 1, a host computer 1 is disposed in a center station and having has a database in which karaoke music-piece data are accumulated. Plural karaoke terminals 2 which are disposed in karaoke parlors are illustratively connected to the host computer 1 via communication lines (public telephone lines or ISDN), so that music-piece data are periodically distributed to the karaoke terminals 2. Hereinafter, portions constituting each karaoke terminal 2 will be described.

The reference numeral 21 designates a CPU (Central Processing Unit) which controls various portions of the terminal connected to the CPU via a BUS. The reference numeral 22 designates a ROM (Read Only Memory) which stores control programs to be executed by the CPU 21 and font data corresponding to word codes included in the music-piece data. The reference numeral 23 designates a RAM (Random Access Memory) which is used as a work area for the CPU 21.

The reference numeral 24 designates a hard disk which stores music-piece data distributed from the host computer 1. In the karaoke terminal 2, music-piece data supplied from the host computer 1 are once accumulated in the hard disk 24, and then read out therefrom to be used. The reference numeral 25 designates a communication controller which receives music-piece data transmitted from the host computer 1 and then transfers the data to the hard disk 24.

The reference numeral 26 designates a panel switch which is disposed in an operation panel (not shown) of the karaoke apparatus, and through which operations such as those instructing the start and stop of a performance, and setting of the volume, the tempo, the key control, the pitch shift and the voice quality for the voice conversion (described later), and the like are conducted. The panel switch 26 supplies an input value or set value corresponding to such an instruction operation or a preset state, to the CPU 21. The reference numeral 27 designates a remote control receiver which receives a signal supplied from a remote control terminal RMC, such as a music piece number, and instruction operations instructing the start and stop of a performance, and which then supplies the signal as an input value to the CPU 21. The reference numeral 28 designates a display panel configured by an LCD (Liquid Crystal Display) or the like, and displays messages such as the numbers of requested music pieces, and various preset states.

The reference numeral 29 designates a tone generator which synthesizes a musical-tone signal corresponding to musical-tone control data (included in the music-piece data) supplied from the CPU 21, and then supplies the synthesized signal to an effect DSP (Digital Signal Processor) 30. The reference numeral 31 designates a voice decoder which generates a voice signal corresponding to ADPCM data (voice data such as a back chorus included in the music-piece data) supplied under the control of the CPU 21, and then supplies the signal to the effect DSP 30.

The reference numeral 32 designates a voice converting unit which applies a predetermined voice conversion process on an input voice from a microphone M which has been amplified by a microphone amplifier 33 and converted into a digital signal by an A/D converter 34. After the A/D conversion, the voice signal is converted by a voice converting unit 32 and supplied to the effect DSP 30 and a scoring device 35. The voice converting unit 32 will be described later in detail.

On the basis of effect imparting control data (included in the music-piece data) supplied from the CPU 21, the effect DSP 30 imparts various effects such as an echo, reverb, and delay to the musical-tone signal supplied from the tone generator 29, a voice signal such as back chorus supplied from the voice decoder 31, and the microphone input on which the conversion process is conducted by the voice converting unit 32. The musical tone to which effects are imparted in this way is converted into an analog signal by a D/A converter 37 and then sent to a sound system 36 to be output as a sound from a loudspeaker.

The scoring device 35 evaluates the singing ability of the singer on the basis of results of analysis of the microphone input by the voice converting unit 32, and outputs the scoring result as a numeric data.

The reference numeral 38 designates a display control unit which controls the display of a monitor 39. During a karaoke performance, the display control unit 38 superimposes font data of words which is read out from the ROM 22, on video data which is supplied from a video data storing unit 40, such as a motion picture CD, to display a background picture for the karaoke performance. The synthesized image is displayed on the monitor 39. After the karaoke performance is ended, the display control unit 38 controls the scoring device 35 so that the scoring result is displayed on the monitor 39. (2) Detail of the voice converting unit 32.

Figure 2:
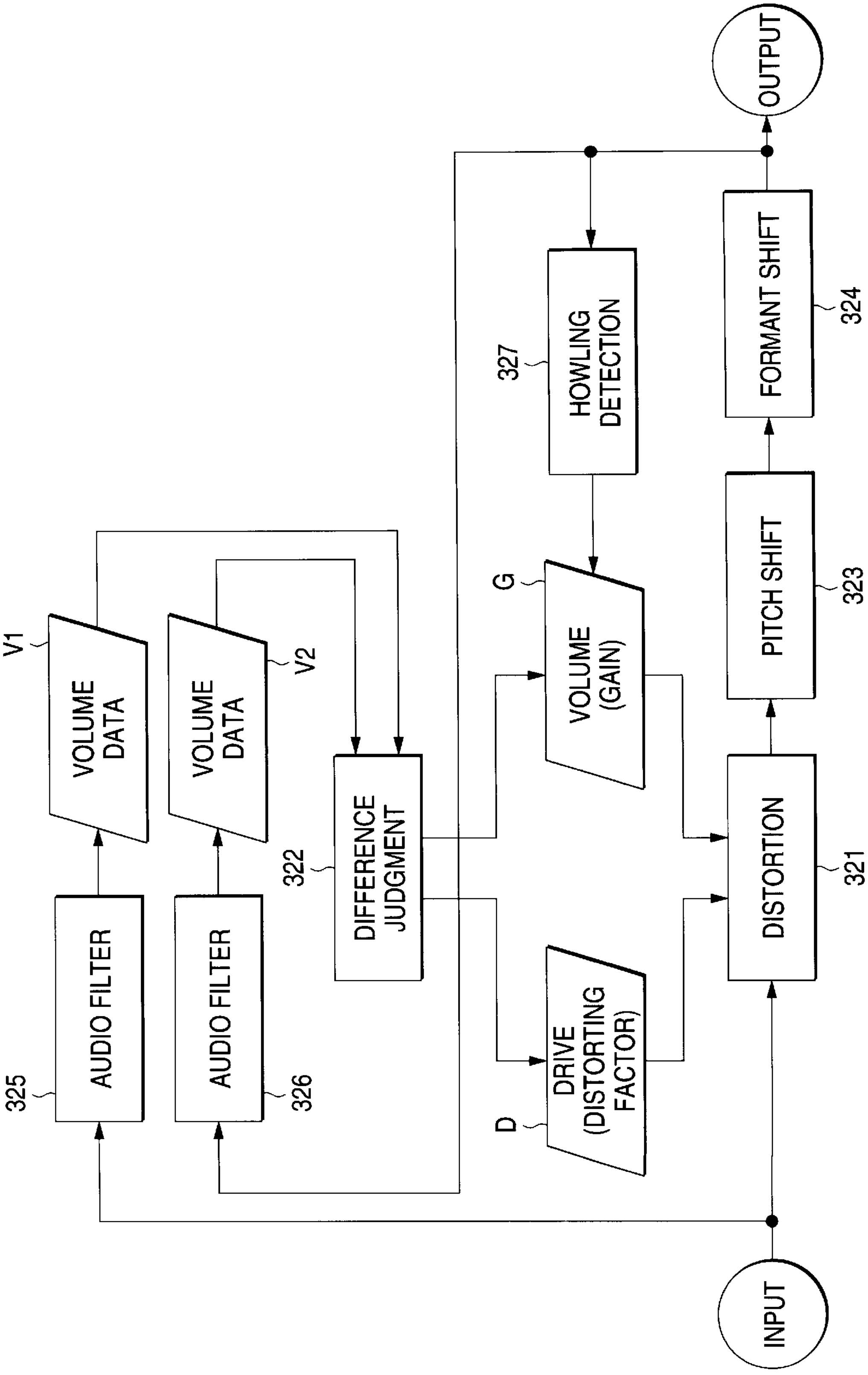
FIG. 2 is a block diagram showing the configuration of a voice converting unit of the embodiment.

Next, the voice converting unit 32 will be described in detail. FIG. 2 is a block diagram showing the configuration of the voice converting unit 32. In FIG. 2, reference numeral 321 designates a distortion circuit which gives distortion to the input voice supplied from the microphone M. The distortion circuit 321 amplifies the input voice signal in accordance with a volume gain G supplied from a difference judging circuit 322, and gives distortion to the amplified input voice signal in accordance with a distorting factor D supplied from the circuit 322. As a result, higher harmonics (i.e., components of a high-pitched sound region) of an amount corresponding to the distorting factor D are added to the input voice signal.

The reference numeral 323 designates a pitch shift circuit which shifts the pitch (i.e., the frequency) of the input voice signal in accordance with a shift amount which is set through the panel switch 26. When the input voice is a voice of a male, for example, the pitch shift circuit 323 can convert the voice into a voice of a female by, for example, shifting the input voice toward higher frequencies by one octave.

The reference numeral 324 designates a formant shift circuit which shifts the formant of the input voice in accordance with the voice quality (for example, the degree of the depth of the voice) which is set through the panel switch 26. When the vocal tract characteristics of the input voice are changed by the formant shift circuit 324, a voice of, for example, a male can be converted into a voice which can be heard as a voice of another person.

The reference numerals 325 and 326 designate audio filters. The audio filter 325 extracts the volume level of the input voice signal, and outputs the extracted volume level as volume data V1. On the other hand, the audio filter 326 extracts the volume level of the output voice signal, and outputs the extracted volume level as volume data V2.

The difference judging circuit 322 compares the volume data V1 and V2 respectively supplied from the audio filters 325 and 326 with each other, and determines the volume gain G and the distorting factor D which are to be supplied to the distortion circuit 321, in accordance with the volume difference between the input and output voices. When the volume of the output voice after conversion is smaller than that of the input voice, for example, the volume gain G is increased. In the case where the input voice is to be shifted toward higher frequencies, when the volume of the output voice after conversion is smaller than that of the input voice, it is judged that the volume of a high-pitched sound region is insufficient, and the distorting factor D is increased in order to enlarge the amount of higher harmonics which are to be added to the input voice.

The reference numeral 327 designates a howling detecting circuit which detects howling of the output voice signal. On the basis of the detection result of the howling detecting circuit 327, the volume gain G which is to be supplied to the distortion circuit 321 is adjusted in order to suppress howling of the output voice signal.

B: Operation of the Embodiment

Next, the operation of the embodiment having the above-described configuration will be described.

(1) Operation of the Whole Karaoke Apparatus

First, the operation of the whole karaoke apparatus of the embodiment will be described. It is assumed that music-piece data are already distributed from the host computer 1 to the karaoke terminal 2 and stored in the hard disk 24.

First, the karaoke terminal 2 is powered on and a music-piece number is designated through the remote control terminal RMC. The remote control receiver 27 then receives the music-piece number. When the CPU 21 identifies the designated music-piece number, the music-piece data corresponding to the music-piece number is read out from the hard disk 24 and reproduction of the data is started.

Accordingly, musical-tone control data such as note data, and duration data included in the music-piece data are supplied to the tone generator 29 and the karaoke performance is then conducted. On the other hand, genre information (information indicating the musical genre of the music piece, the season, and the like) included in the header of the music-piece data is read out, and the background picture corresponding to the information is reproduced from the video data storing unit 40 to be displayed on the monitor 39. The font image corresponding to the word codes included in the music-piece data is superimposed on the background picture displayed on the monitor 39.

On the other hand, a vocal sound of the user is input through the microphone M. In the effect DSP 30, various effects such as an echo and a reverb are imparted to the vocal sound, the karaoke musical tone output from the tone generator 29, and the back chorus sound output from the voice decoder 31. The sounds are then sent to the sound system 36 to be output as a sound from the loudspeaker.

(2) Operation of the Voice Conversion

Next, the operation in the case where the user instructs the operation mode of the voice conversion through the panel switch 26 in the above-mentioned karaoke performance will be described. When the user instructs the voice conversion mode and sets a desired pitch shift amount and a desired voice quality through the panel switch 26, the set value of the pitch shift amount is supplied to the pitch shift circuit 323 and the set value of the formant shift amount corresponding to the voice quality is supplied to the formant shift circuit 324. Accordingly, the frequency characteristics of the output voice which are the target of the conversion are determined, and thereafter the voice conversion of the input voice is conducted so that the frequency characteristics coincide with the determined target.

Figure 3A:
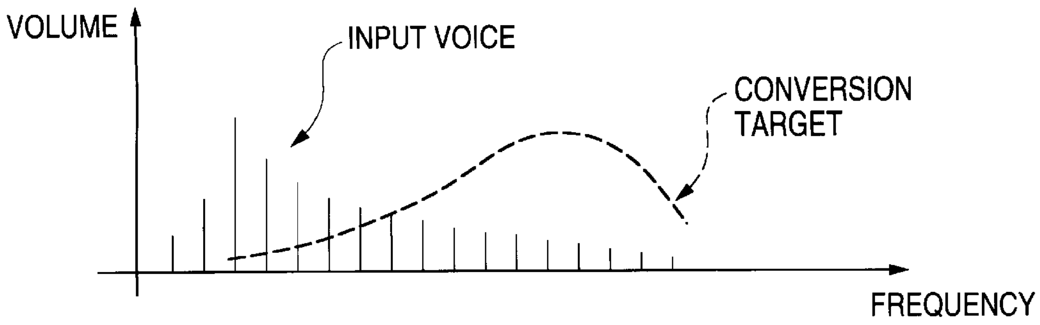
FIGS. 3*a* to 3*c* each shows view illustrating the addition of a volume in the embodiment.
Figure 3B:
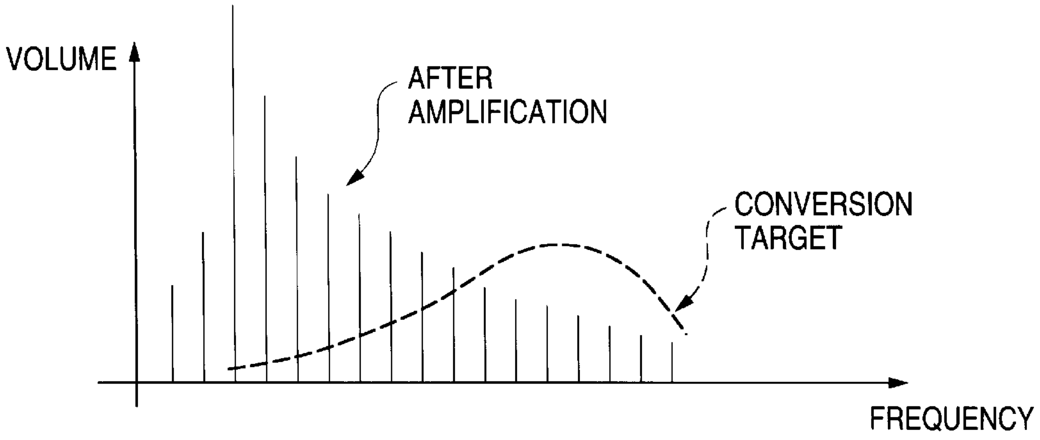
Figure 3C:
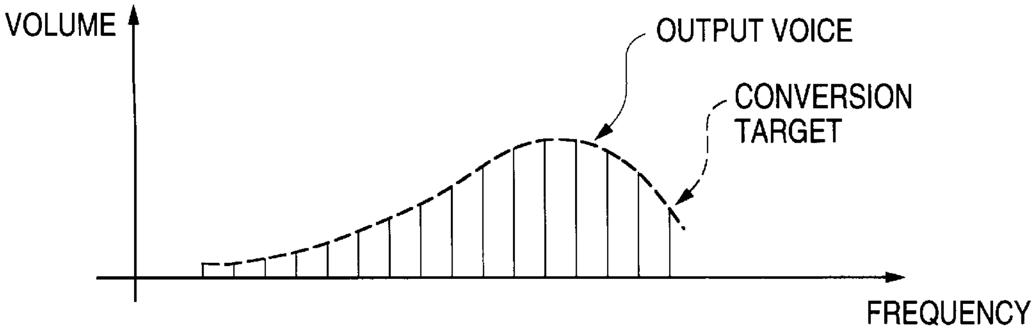

For example, as shown in FIGS. 3*a* to 3*c*, the case where, although the input voice is a voice of a male and components of a high-pitched sound region are originally small in amount, the input voice is to be converted so as to have frequency characteristics (conversion object) of a voice of a female will be considered (see FIG. 3*a*). In this case, the low-pitched sound region which occupies most of the input voice is cut off, and hence the volume of the output voice as a whole is reduced as compared with that of the input voice.

In this case, since the difference between the volume data V1 and V2 is large, the difference judging circuit 322 controls the volume gain G so as to be increased. Accordingly, after the input voice signal is amplified as a whole and the shortage of components of a high-pitched sound region is compensated (see FIG. 3*b*), the pitch shift and the formant shift are conducted so that the frequency characteristics coincide with the target ones (see FIG. 3*c*).

Figure 4A:
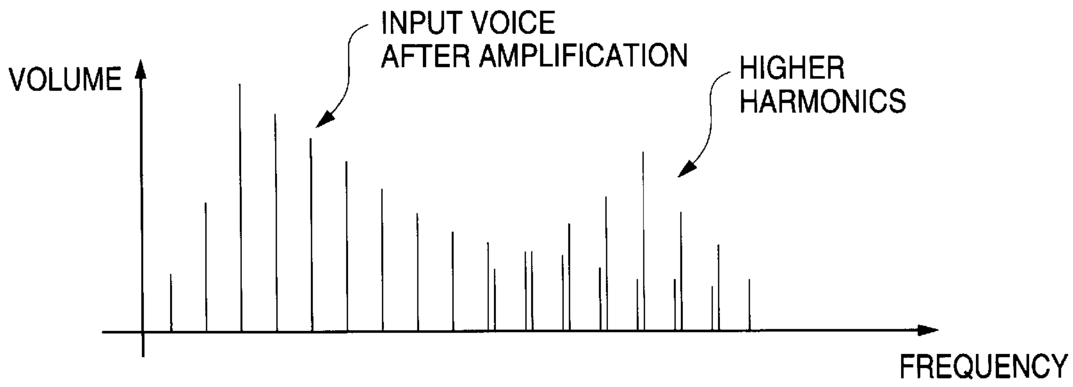
FIGS. 4*a* and 4*b* each shows a view illustrating the addition of higher harmonics in the embodiment.
Figure 4B:
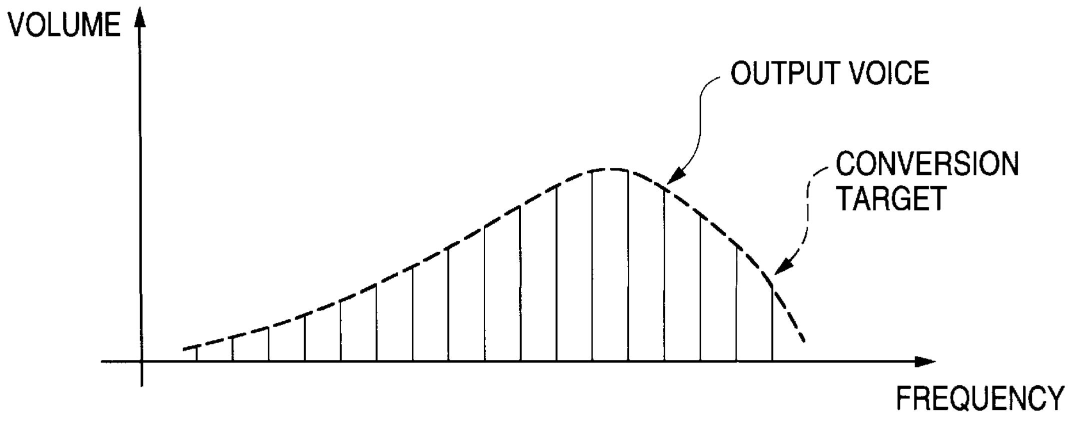

In consideration of the case where the amplification based on the volume gain G is insufficient for compensating components of a high-pitched sound region, as shown in, for example, FIGS. 4*a* and 4*b*, the distortion circuit 321 adds distortion to the input voice signal, thereby adding higher harmonics (components of a high-pitched sound region) (see FIG. 4*a*). The amount of the added higher harmonics is controlled in accordance with the value of the distorting factor D. Specifically, when the difference between the volume data V1 and V2 is large, the distorting factor D is increased, so that the amount of higher harmonics is enlarged, and, when the difference between the volume data V1 and V2 is small, the distorting factor D is decreased, so that the amount of higher harmonics is reduced. After higher harmonics are added and the shortage of components of a high-pitched sound region is compensated in this way, the pitch shift and the formant shift are conducted so that the frequency characteristics coincide with the target ones (see FIG. 4*b*).

As described above, in the voice conversion according to the embodiment, the output voice is fed back to the input side, and, when the volume difference between the input and output voices is large, the input voice is amplified so that the difference is corrected, and the voice conversion is conducted. When the volume of a high-pitched sound region is small, the voice conversion is conducted while higher harmonics are added to the input voice by increasing the distorting factor D of distortion, so that the volume of a high-pitched sound region is compensated. Furthermore, the volume gain G is adjusted on the basis of the detection result of the howling detecting circuit 327, and howling of the output voice signal is suppressed. Accordingly, nonuniformities such as reduction of the volume and unnaturalness due to the voice conversion can be compensated.

C: Modifications

The invention is not limited to the abovedescribed embodiment, and can be, for example, modified in various manners as follows.

(I) In the above embodiment, after the input voice is amplified, distortion is added by the distortion circuit 321 in order to compensate higher harmonics. The invention is not restricted to this. Even when only volume is added by an amplifier, it is possible to attain an effect of compensating the volume reduction of the output voice. In other words, the addition of higher harmonics is effective in the voice conversion in which components of a high-pitched sound region are insufficient, such as the case where a voice of a male is converted into that of a female.

(II) In the above embodiment, correction of the volume has been described as an example. The invention is not restricted to this. Another parameter may be used as an object of the correction. For example, the interval may be corrected.

(III) In the above embodiment, the pitch shift and the formant shift are used together as the voice converting device. The invention is not restricted to this. Only one of the shifts may be used, or the shifts may be replaced with an equalizer.

(IV) In the scoring of the singing ability, the scoring device 35 may use the extracted interval in addition to the volume extracted from the input voice. The parameters such as the volume and the interval may be extracted from the input voice and also from the output voice which has undergone the voice conversion, and the scoring may be conducted on the basis of the extracted parameters.

As described above, according to the invention, the conversion result can be fed back to the input side and the voice conversion can be conducted in a manner suitable for the characteristics of the input voice. Therefore, nonuniformities of the voice conversion due to differences in characteristics of input voices can be compensated. As a result, the voice conversion can be positively conducted, and the range in which the conversion is enabled can be broadened.

What is claimed is:

1. A voice converter, comprising:

a first extracting device which extracts a first parameter from an input voice;

a voice converting device which converts the input voice into a voice having different frequency characteristics, and outputs the voice;

a second extracting device which extracts a second parameter from the voice output from the voice converting device;

a comparing device which compares the first and second parameters with each other; and a controlling device which controls a conversion process conducted by the voice converting device, on the basis of a comparison result of the comparing device.

2. The voice converter of claim 1, wherein conversion conducted by the voice converting device includes a pitch shift.

3. The voice converter of claim 1, wherein conversion conducted by the voice converting device includes a formant shift.

4. A voice converter, comprising:

a first extracting device which extracts a volume level of an input voice;

a voice converting device which converts the input voice into a voice having different frequency characteristics, and outputs the voice;

a second extracting device which extracts a volume level of the voice output from the voice converting device;

a comparing device which compares the volume levels extracted by the first and second extracting devices, and outputs a difference between the volume levels; and a volume adding device which amplifies a volume of the input voice which is to be supplied to the voice converting device, in accordance with the volume difference output from the comparing device.

5. The voice converter of claim 4, wherein conversion conducted by the voice converting device includes a pitch shift.

6. The voice converter of claim 4, wherein conversion conducted by the voice converting device includes a formant shift.

7. A voice converter, comprising:

a first extracting device which extracts a volume level of an input voice;

a voice converting device which converts the input voice into a voice having different frequency characteristics, and outputs the voice;

a second extracting device which extracts a volume level of the voice output from the voice converting device;

a comparing device which compares the volume levels extracted by the first and second devices, and outputs a difference between the volume levels; and a higher-harmonic adding device providing distortion to the input voice which is to be supplied to the voice converting device, in accordance with the volume level difference output from the comparing device, thereby adding higher harmonics to the voice.

8. The voice converter of claim 7, wherein conversion conducted by the voice converting device includes a pitch shift.

9. The voice converter of claim 7, wherein conversion conducted by the voice converting device includes a formant shift.

* * * * *